(12) United States Patent
Genovese

(10) Patent No.: US 6,285,389 B1
(45) Date of Patent: Sep. 4, 2001

(54) SINGLE SENSOR LASER BEAM SYNCHRONIZER AND INTENSITY REGULATOR

(75) Inventor: Frank C. Genovese, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 695 days.

(21) Appl. No.: 08/674,308

(22) Filed: Jul. 1, 1996

(51) Int. Cl.[7] .................................................. B41J 2/435
(52) U.S. Cl. ............................................ 347/250; 347/246
(58) Field of Search .................................... 347/250, 131, 347/132, 251, 235, 236, 237, 241, 246, 247, 248, 256; 399/239; 528/15

(56) References Cited

U.S. PATENT DOCUMENTS 4,978,975 * 12/1990 Saito ...................................... 347/250
5,314,979 * 5/1994 Okinoshima et al. .................. 528/15
5,519,473 * 5/1996 Morehouse, Jr. et al. ............ 399/239
5,592,298 * 1/1997 Caruso .................................. 347/131

FOREIGN PATENT DOCUMENTS

2235317 * 2/1991 (GB) .................................... 347/250

* cited by examiner

Primary Examiner—Hai C. Pham
(74) Attorney, Agent, or Firm—John M. Kelly; David E. Henn

(57) ABSTRACT

A raster output scanner in which both the start-of-scan and the beam intensity of a laser beam are determined using a single photodetector. The raster output scanner has a laser source for generating a laser beam; a rotating polygon for sweeping the laser beam along a scan line plane, an optical fiber with a light receiving end positioned at a known position in the scan line plane and which intercepts at least a portion of the sweeping laser beam, and a photodetector for converting the intercepted laser beam into a beam current. The raster output scanner further includes both a scan detection circuit for producing a star-of-scan signal from the beam current and a beam intensity circuit for producing an electrical output which depends upon the magnitude of the beam current.

9 Claims, 5 Drawing Sheets

SINGLE SENSOR LASER BEAM SYNCHRONIZER AND INTENSITY REGULATOR

The invention relates to raster output scanners, and more particularly, to a technique for producing both synchronization timing signals and laser beam intensity signals using a single light sensor.

The following patent assigned to the assignee hereof is incorporated by reference: U.S. Pat. No. 4,952,022.

BACKGROUND OF THE INVENTION

Electrophotographic marking is a well known method of copying or printing documents by exposing a substantially uniformly charged photoreceptor to an optical light image of an original document, discharging the photoreceptor to create an electrostatic latent image of the original document on the photoreceptor's surface, selectively adhering toner to the latent image, and transferring the resulting toner pattern from the photoreceptor, either directly to a marking substrate such as a sheet of paper, or indirectly after an intermediate transfer step. The transferred toner powder image is fused to the marking substrate using heat and/or pressure to make the image permanent. Finally, the surface of the photoreceptor is cleaned of residual developing material and recharged in preparation for the creation of the next image.

While many types of light exposure systems have been developed, a commonly used system is the raster output scanner (ROS) comprised of a laser beam source, a means for modulating the laser beam (which, as in the case of a laser diode, may be the action of turning the source itself on and off) so that the laser beam contains image information, a rotating polygon mirror having one or more reflective surfaces, pre-polygon optics for collimating the laser beam, post-polygon optics to focus the laser beam into a well-defined spot on the photoreceptor surface and to compensate for the mechanical error known as polygon wobble, and one or more path folding mirrors to reduce the overall physical size of the scanner housing. The laser source, modulator, and pre-polygon optics produce a collimated laser beam which is directed to strike the reflective polygon facets. As the polygon rotates, the reflected beam passes through the post-polygon optics and is redirected by any folding mirrors to produce a focused spot that sweeps along the surface of the charged photoreceptor in a straight scan line. Since the photoreceptor moves in a direction substantially perpendicular to the scan line, the swept spot covers the entire photoreceptor surface in a raster pattern. By suitably modulating the laser beam in accordance with the position of the exposing spot at any instant, a desired latent image can be produced on the photoreceptor.

To assist the understanding of the present invention, several things should be noted and described in further detail. First, the phenomenon known as scan line jitter is caused by the failure of pixels in successive scan lines to be precisely aligned with each other. It is common practice to position a photodetector element in the scan line path just ahead of the latent image area in order to establish an accurate measure of beam timing on successive scans. When the laser beam crosses the photodetector, a start-of-scan signal is produced which initializes the pixel clock controlling the data stream that modulates the laser beam. Second, in high quality imaging systems it is important that the laser beam have a stabilized intensity so that optimum exposure can be maintained. This enables optimization of the charging and development systems which are critical to producing high quality images. Having known beam intensities becomes even more important when multiple laser beams are used, such as in a color printer. Since the intensity of the laser beam from a laser source driven by a fixed current is strongly effected by operating temperature and changes with time due to aging, and since the output power of different laser sources driven by the same current can be quite different, the ability to dynamically regulate the intensity of the laser beams is important. Such regulation is typically implemented using a dedicated photodetector.

Normally, the production of the start-of-scan signal and the regulation of the laser beam intensity are carried out independently with separate photodetectors and separate preamplifiers, plus sufficient electrical support which includes connectors, wiring, and physical space for the two light sensing systems. The use of separate systems unnecessarily increases cost and both manufacturing and assembly overhead while potentially reducing system reliability. Therefore, a technique of achieving start-of-scan detection and dynamic beam intensity regulation using a single photodetector system for both functions would be beneficial.

SUMMARY OF THE INVENTION

The principles of the present invention provide for producing both a start-of-scan signal and a laser beam intensity control signal using a single photodetector. A raster output scanner according to the present invention is comprised of a laser source for generating a beam of laser light; a rotating polygon having at least one reflecting mirror facet for sweeping the laser beam along a scan line plane, an optical fiber with a light receiving end positioned at a predetermined location in the scan line plane to collect a portion of the light flux in the sweeping laser beam, and a photodetector for receiving the flux emitted from the exit end of the optical fiber and for converting the emitted flux into a beam-dependent electrical current. The raster output scanner further comprises a scan detection circuit for producing a start-of-scan signal from the beam dependent current, and a beam intensity circuit for producing an electrical output signal which depends upon the magnitude of the beam dependent current and thus upon the laser beam intensity.

BRIEF DESCRIPTION OF THE DRAWINGS

In the drawings, like numbers designate like elements, Additionally, the text includes directional signals which are taken relative to the drawings (such as right, left, top, and bottom). Those directional signals are meant to aid the understanding of the present invention, not to limit it.

DETAILED DESCRIPTION OF THE PREFERRED EMBODIMENTS

Figure 1:
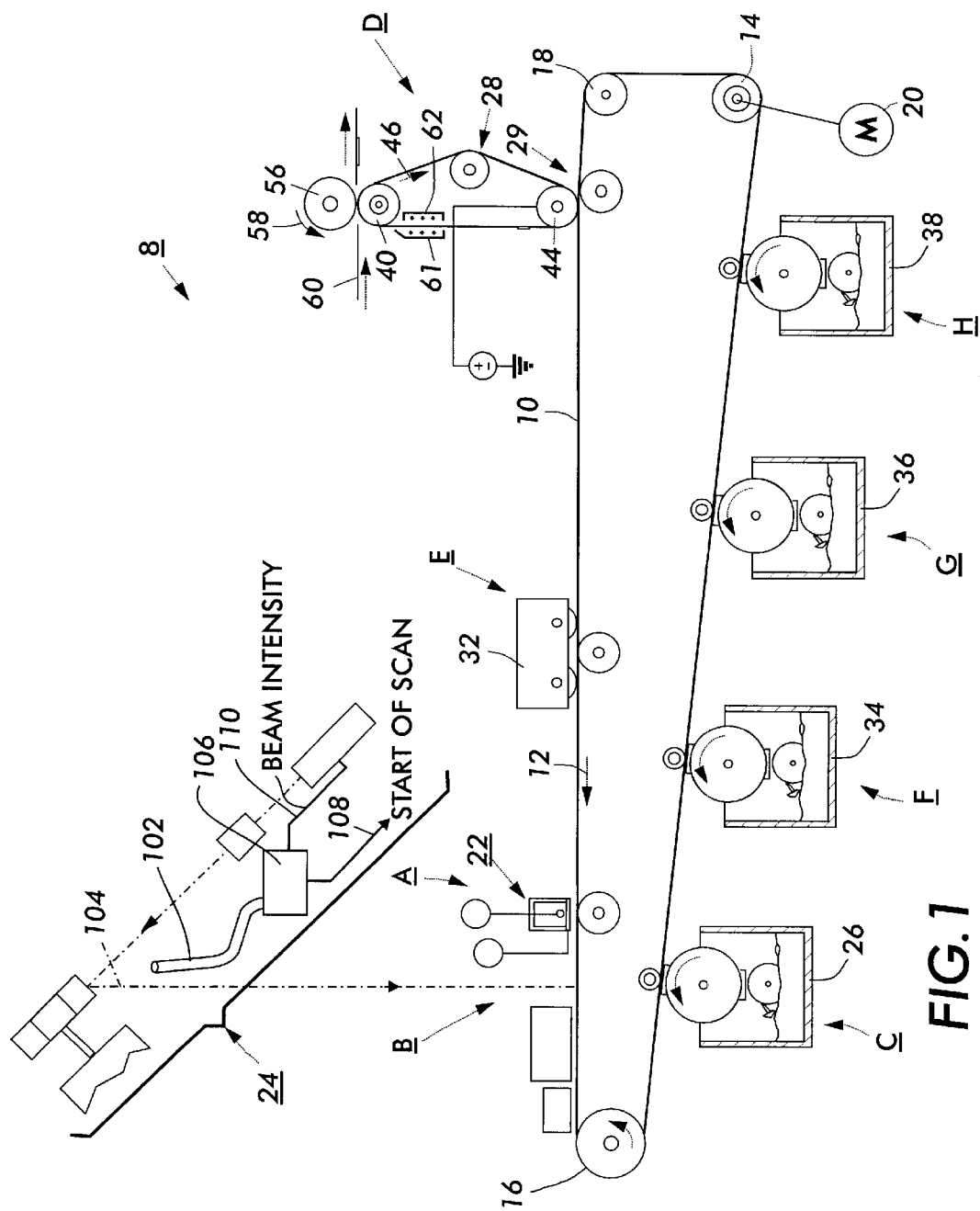
FIG. 1 schematically illustrates an electrophotographic printing machine which incorporates the principles of the present invention.

FIG. 1 illustrates an electrophotographic printing machine 8 designed to produce original documents. Although the principles of the present invention are well suited for use in such machines, they are also well suited for use in other devices. Therefore it should be understood that the present invention is not limited to the particular embodiment illustrated in FIG. 1 or to the particular application shown therein.

The printing machine 8 includes a charge retentive component in the form of an Active Matrix (AMAT) photoreceptor 10 which has a photoconductive surface and which travels in the direction indicated by arrow 12. Photoreceptor 10 is mounted on drive roller 14 and tension rollers 16 and 18, with drive roller 14 turned by drive motor 20.

As the photoreceptor advances, each part passes through the subsequently described processing stations in sequence. For convenience, a single section of the photoreceptor, referred to as the image area, is identified. The image area is the part of the photoreceptor processed by the various stations to produce toner layers. While the photoreceptor may have numerous contiguous image areas, each is processed in the same way. Therefore, a description of the processing of one image area suffices to explain the operation of the printing machine.

As the photoreceptor 10 advances, the image area passes through a charging station A. At charging station A a corona generating scorotron 22 charges the image area surface to a relatively high and substantially uniform potential, for example −500 volts. While the image area is described as being negatively charged, it could be positively charged if the voltage levels and polarities of the other relevant sections of the printing machine are appropriately reconfigured. It is to be understood that the scorotron 22 is supplied electrical power as required for proper operation.

After passing through the charging station A, the photoreceptor is advanced to an exposure station at B where the charged image area is exposed by laser-based raster output scanning assembly 24 which illuminates the image area with a raster representation of a first color image, say black. The optical laser beam flux in the raster representation discharges the image area in a pattern corresponding to input control data thereby creating a first electrostatic latent image. While various aspects of the raster output scanning assembly 24 are described in more detail subsequently, it should be understood that the raster output scanning assembly includes an optical fiber 102 strategically placed in the path of the output laser beam 104 so that flux collected by optical fiber 102 is guided to sensor network 106. Sensor network 106 is configured to generate both an output start-of-scan signal 108 and an output beam intensity signal 110 from the detected flux in a manner which is subsequently described.

After passing through the exposure station B, the exposed image area passes through a first "discharged area development" station C where a negatively charged development material 26 comprised of black toner particles is advanced to the image area. The development material is attracted to the less negative discharged sections of the image area and repelled by the more negative unexposed sections. The result is a first toner pattern on the image area that corresponds to the first electrostatic latent image. It will be recognized by those practiced in the art that the present invention can be applied in the case of charged area development, and that the development structures illustrated in FIG. 1 and labeled C, F, G, and H, are of a design suitable for advancing toner particles suspended in a liquid solution to the surface of photoreceptor 10. However, it should be understood that the present invention is not limited to the particular embodiment shown therein.

After passing through the first development station C the image area advances to a transfusing module D that includes a positively charged transfusing member 28, which may be a belt as illustrated in FIG. 1, or a drum, forming a first transfer nip 29 with the photoreceptor surface. The first transfer nip is characterized by a first region of compression or pressure between the photoreceptor 10 and the surface of transfusing member 28 where negatively charged toner layer on the photoreceptor is attracted by the positive potential of the transfusing member.

After the first toner image is transferred to the transfusing member 28, the image area passes to a cleaning station E which removes untransferred development material and other residue from the surface of photoreceptor 10 using one or more cleaning brushes contained in housing 32.

The image area is advanced through the charge-expose-develop-transfer-clean sequence for a second color of developer material (say yellow). Charging station A recharges the image area and exposure station B illuminates the recharged image area with an optical raster representation of a second color image (yellow) to create a second electrostatic latent image. The image area is advanced to a second development station F where second negatively charged development material 34 comprised of yellow toner particles is deposited on the image area in a pattern corresponding to the second electrostatic latent image. The image area and adhered toner pattern advances to the transfusing module D where the second color toner is transferred to the transfusing member 28.

The image area is cleaned by the cleaning station E, and the charge-expose-develop-transfer-clean sequence is repeated for a third color of development material 36 (say magenta) using development station G, and finally for a fourth color 38 (cyan) of development material using development station H.

The transfusing member 28 is entrained between a transfuse roller 40 and a transfer roller 44. The transfuse roller is driven at constant velocity by a motor, which is not shown, such that the transfusing member advances in the direction 46 at the same velocity as photoreceptor 10. The spacing between successive image areas is regulated to match the circumference of transfusing member 28 to maintain mechanical synchronism and allow the various toner images to be transferred to the transfusing member 28 in proper registration.

Still referring to FIG. 1, transfusing module D includes a backup roller 56 which rotates in direction 58. The backup roller 56 located opposite the transfuse roller 40 forms a second nip with the transfusing member 28 which is under pressure and acts as a transfusing zone. When a substrate 60 such as paper passes through the transfusing zone, the composite toner layer on the surface of transfusing member 28 is heated by thermal energy accumulated from a radiant preheater 61 or from a conductive preheater 62, and heat conducted directly from the transfuse roller 40. The combination of heat and pressure in the nip fuses the composite toner layer onto the substrate surface making a permanent color image.

Figure 2:
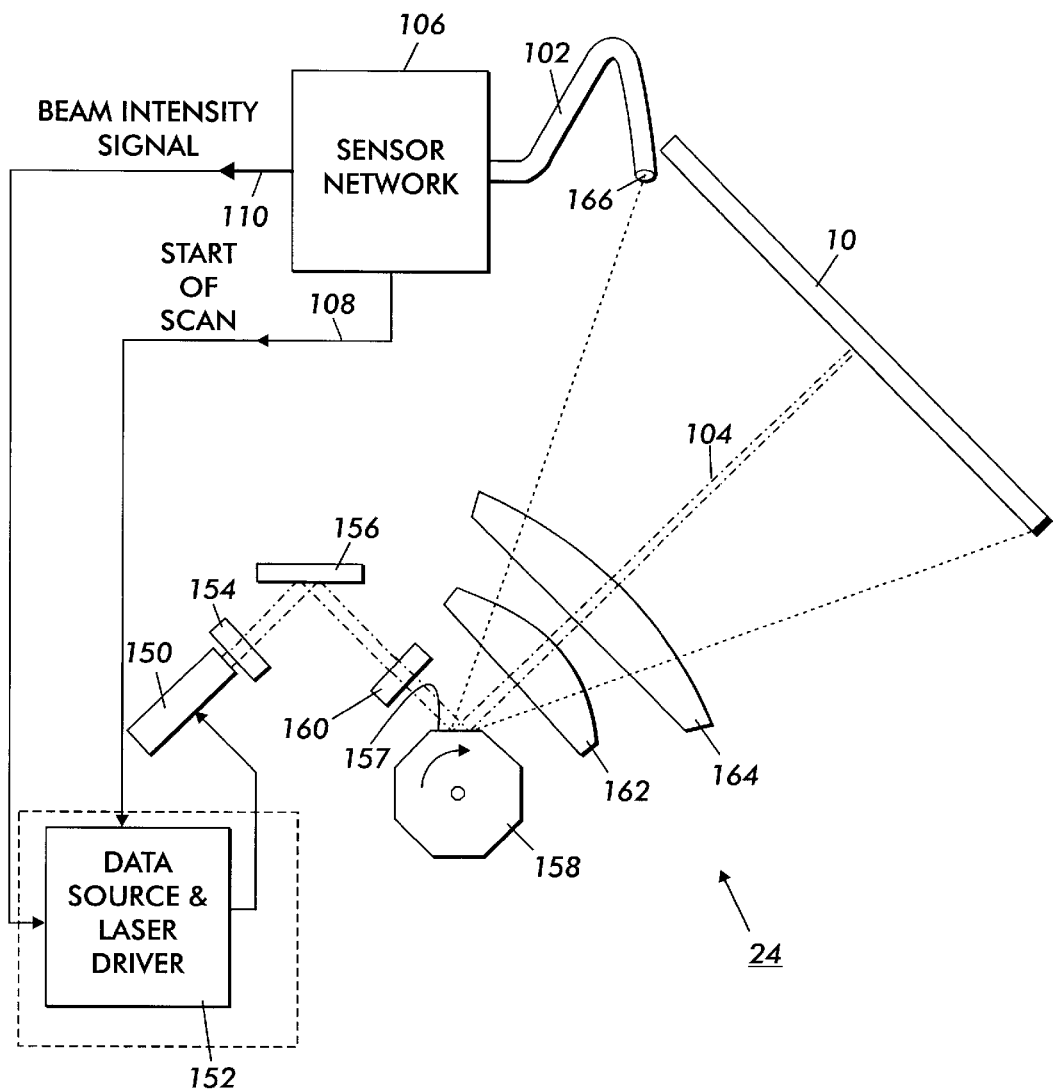
FIG. 2 is a top view of the raster output scanner used in the electrophotographic printing machine illustrated in FIG. 1.

The present invention is functionally associated most closely with the raster output scanning assembly 24. Referring now to FIG. 2, the raster output scanning assembly 24 includes a modulated laser diode 150 which is excited to form laser beam 104 according to input image data from a data source and laser driver 152 (which may be physically remote from the raster output scanning assembly 24). The output flux from laser 150 is collimated by optical element 154 and reflected by fold mirror 156. The collimated beam is then focused on reflective facets 157 of rotating polygon 158 by cylindrical lens 160. Each facet of rotating polygon 158 deflects the beam which is focused into a well defined spot on the surface of photoreceptor 10 (also see FIG. 1) by scan lens elements 162 and 164.

As polygon 158 rotates, the sharply focused spot formed by laser beam 104 traces a narrow path on the surface of photoreceptor 10 that defines the scan line. The input end 166 of the optical fiber 102 is positioned along the scan line path just ahead of the active image area of photoreceptor 10 and oriented to collect light flux from beam 104 that is incident directly on the fiber end. The optical fiber transmits the intercepted light flux to the sensor network 106.

Figure 3:
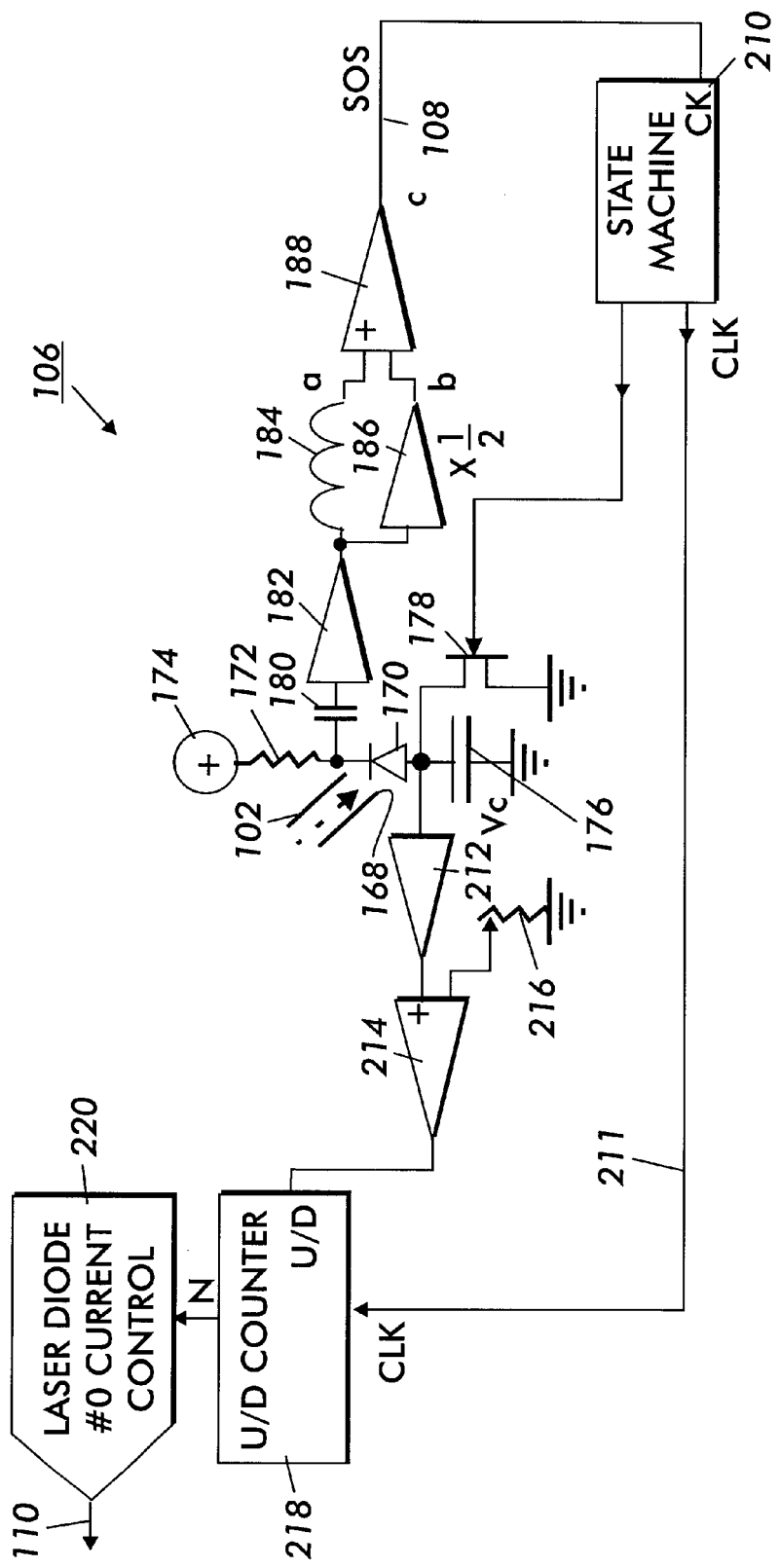
FIG. 3 schematically illustrates a network which produces a start-of-scan and which also establishes the beam intensity of the laser in the raster output scanner of FIG. 2.

FIG. 3 illustrates the sensor network 106 in more detail. Light flux emerging from the output end 168 of optical fiber 102 is directed onto a fast photodetector 170. The photodetector is reverse biased with its cathode connected via a resistor 172 to a power supply 174, and its anode connected to a common voltage node comprising one lead of a capacitor 176, the drain of a field effect transistor 178 in a common source configuration, and the input of a voltage comparator as is subsequently described. Light flux collected when the scanned spot formed by laser beam 104 strikes the input end of the optical fiber illuminates the photodetector. The resulting photoinduced current pulse develops a voltage pulse on the cathode of the photodetector and delivers a charge pulse to the capacitor 176. As is described below, the voltage pulse on the cathode of the photodetector is used to generate a start-of-scan logical transition essentially calibrating the data bit stream clock with respect to the starting time of each scan. The rate at which the capacitor voltage increases as current pulses accumulate charge on the capacitor depends on the collected light flux which is used to control the intensity of the laser beam 104 through the operating level of modulated laser diode 150.

Still referring to FIG. 3, the voltage pulse on the photodetector cathode passes through DC blocking capacitor 180 to buffer amplifier 182 and drives delay line 184 and attenuator 186 in parallel. The time delayed pulse delivered by delay line 184 is applied to the non-inverting input of a fast comparator 188, while the attenuator 186 output is applied to the inverting input of the comparator. The comparator generates a start-of-scan positive going logical transition output 108 that is invariant with respect to the amplitude of the pulse delivered by buffer amplifier 182.

Figure 4:
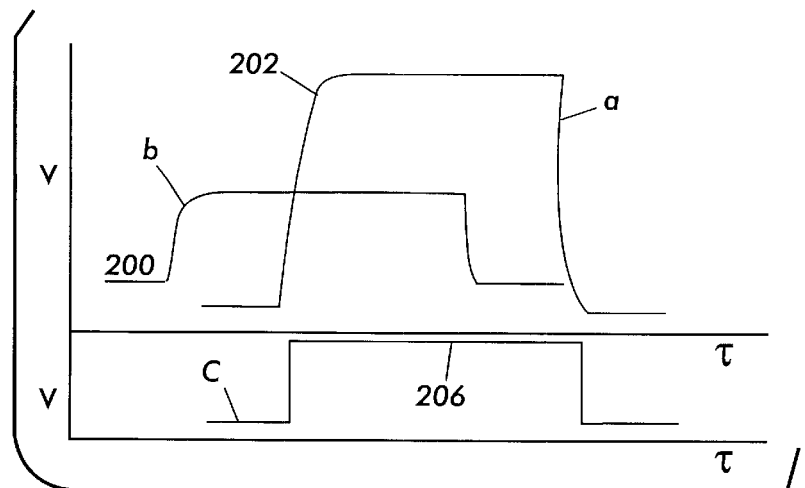
FIG. 4 illustrates the operation of the start-of-scan detector used in the network shown in FIG. 3.
Figure 6:
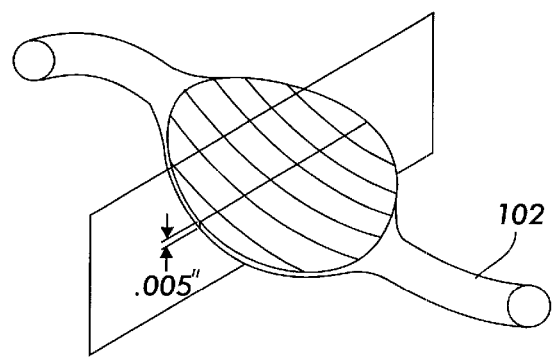
FIG. 6 illustrates the optical fiber of FIG. 5 during fabrication.

The operation of the comparator 188 is described with reference to FIG. 4. The temporal profile of the attenuator output is illustrated by trace 200, while the output of the delay line on the same scale for the same pulse input is illustrated by trace 202. The comparator input is biased so that the quiescent voltage of input b always exceeds the quiescent voltage of a by a small margin. A voltage pulse delivered to the parallel inputs of the attenuator and delay line causes the voltage of trace 202 to exceed the voltage of trace 200. At the crossover point, the comparator output is a positive going pulse transition or edge indicated by trace 206 which defines the start-of-scan signal 108. It will be understood by those practiced in the electronic art that when the amplitudes of traces 200 and 202 are proportional, the crossover point can be chosen to coincide with the steepest rising slope of trace 202 in order to provide the least uncertain timing of the start-of-scan signal. It will also be understood that the flat portion at the top of trace 200 can be a natural consequence of the focused spot formed by laser beam 104 being smaller than the aperture of the input end 166 of optical fiber 102. As shown in FIG. 6, a fiber aperture of about 0.005 inches is substantially larger than the focused spot of about 40 microns associated with a printing machine 8 capable of imaging 600 spots per inch. Electronic pulse stretching means can also be provided as part of the network defining amplifier 182 to ensure that traces 200 and 202 exhibit relatively flat top portions.

Refer now once again to FIG. 3 for a description of the components used to control the laser beam intensity. The gate of the field effect transistor 178 is controlled by state machine 210 which is clocked by the start-of-scan signal 108. The voltage on the capacitor 176 is buffered by amplifier 212 and is applied to the non-inverting input of comparator 214. The inverting input is established at a reference voltage from a voltage divider 216. As shown in FIG. 3 the output of the comparator 214 controls the incrementing direction of an Up/Down counter 218, which is clocked by the state machine 210 on a line 211. The Up/Down counter contains a binary integer which determines the analog output level of digital-to-analog (D to A) laser diode current control circuit 220. The D to A output level 110 controls the drive current applied to the laser diode, and thus the intensity of the laser beam 104 in the "on" state.

The operation of the components used to control the laser beam intensity will now be explained. First, after receipt of a start-of-scan signal indicating that the laser beam is positioned at the critical point in the input aperture of optical fiber 102, the state machine 210 drives the gate of the field effect transistor 178 positive and fully discharges capacitor 176. After a fixed discharge time, the field effect transistor is turned off and a predetermined number of start-of-scan events is counted. Each time the laser beam sweeps across the optical fiber, the photoinduced current from the photodetector 170 accumulates in capacitor 176. The capacitor voltage is buffered by amplifier 212 and compared with the fixed voltage from the voltage divider 216 by the comparator 214. When the predetermined number of start-of-scan events is reached, the output of the comparator 214 will be in one of two states depending on the capacitor voltage which is a measure of the accumulated charge. At the next start-of-scan event the state machine 210 applies a clocking transition to the Up/Down counter 218 via line 211. If the state of the comparator output indicates that the capacitor voltage is less than the fixed reference voltage, the binary integer stored by the Up/Down counter is incremented such that the beam intensity control signal causes the laser drive current, and thus the laser beam intensity, to increase. Conversely, if the state of the comparator indicates a capacitor voltage higher than the fixed reference voltage, the contents of the Up/Down counter is decremented, reducing the laser drive current, and thus decreasing the laser beam intensity.

Figure 5:
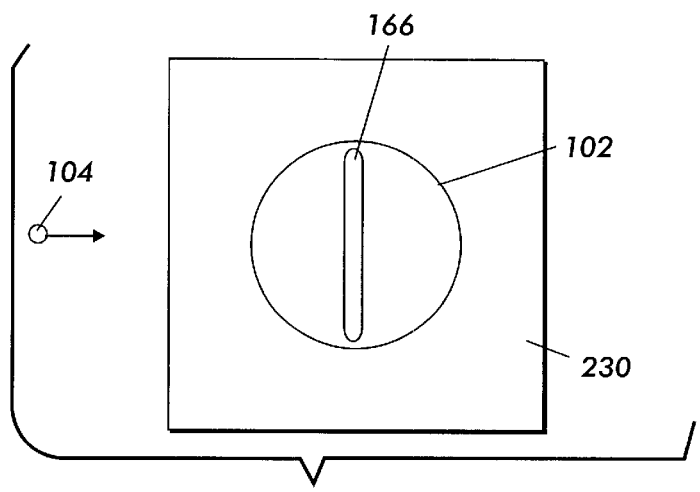
FIG. 5 shows the front of the optical fiber used in the raster output scanner of FIG. 2.

Beneficially the optical fiber 102 has a shaped receiving end 166 of relatively constant width, which delivers fast rise and fall time light pulses to photodetector 170. Referring now to FIG. 5, the receiving end is elongated and is orientated with the laser beam 104 sweeping along a line substantially perpendicular to the axis of elongation. Beneficially, part of the optical fiber is embedded in epoxy 230 such that the receiving end may be conveniently adjusted and spatially fixed in the path of the laser beam 104.

Referring now to FIG. 6, a major step in fabricating the receiving end 166 is to heat and reshape an optical fiber to have an elongated cross-section about 5 mils thick. The elongated portion is severed and can produce pairs of optical fibers with elongated ends. The elongated fiber ends are orientated and potted with epoxy in a ferrule or other suitable housing (with the body of the optical fiber remaining exposed) for mounting in the electrophotographic printing machine 8. The elongated end is machined flat and polished with a polishing paste at a predetermined angle. The output end 168 of optical fiber 102 may be similarly potted in a suitable housing for ease of mounting in the electrophotographic printing machine 8. Because of the specially fabricated receiving end 166, the optical fiber is beneficially comprised of a plastic optical fiber.

For examples of methods for forming the ends of optical fibers, reference is made to U.S. Pat. No. 4,952,022 which is hereby incorporated by reference.

Figure 7:
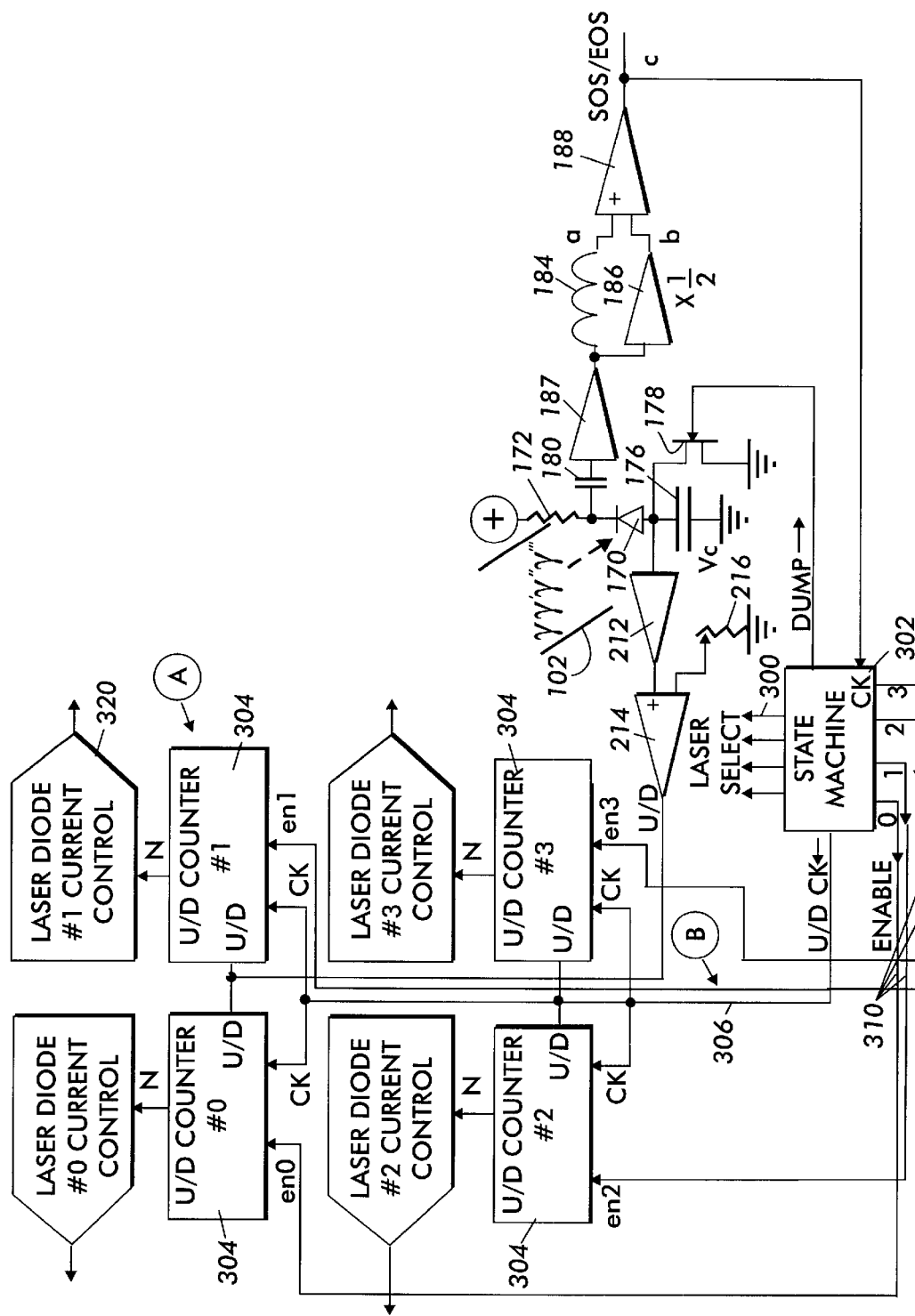
FIG. 7 schematically illustrates a network which detects the start-of-scan and which establishes the beam intensity of four laser beams.

While the foregoing has described a raster scanner assembly which uses a single laser diode, the principles of the present invention are equally applicable to multiple laser diode raster scanner assembly systems. For example, FIG. 7 illustrates in schematic form a network which can produce start-of-scan signals and beam intensity control signals in a four laser diode raster scanner assembly system. It is to be understood that the optical fiber 102 is placed in the path of the four sweeping laser beams, and that those beams have a predetermined spatial and temporal relationship. In addition, it is to be understood that the state machine 302 sequentially controls which one of the four laser diodes is operational and provides illumination during the short period that the start-of-scan pulse is generated (the others being turned off).

Assume in the following that a laser diode which produces a beam 1 is illuminated at the initiation of the scan and generates a start-of-scan transition as described above. In response to the start-of-scan input, state machine 302 first drives the gate of the field effect transistor 178 positive for a fixed discharge time to fully discharge capacitor 176, and then turns the field effect transistor off to allow photoinduced currents in photodetector 170 to accumulate on capacitor 176 for a predetermined number of scans. The voltage on the capacitor is buffered by amplifier 212 and compared with the reference voltage from voltage divider 216 by the comparator 214. The output of the comparator, which is in one of two states, is applied to the direction control of all four Up/Down counters 304. One of those, designated A, is related to the beam 1. The four counters are also connected via a common clock line to the state machine 302. In addition, each counter is connected to the state machine by an individual enable line 310. One of those enable lines, designated B, is related to the Up/Down counter designated A (and thus to the beam 1). When the predetermined number of start-of-scan events has been reached, the state machine 302 applies a true state on the enable line designated B followed by a clock transition to the clock input of all of the Up/Down counters in parallel. Only the Up/Down counter 304 designated A reacts to the state of the comparator 214 and the clock transition from the state machine 302. If the state of the comparator is such that the capacitor voltage is less than the fixed reference voltage, the integer stored in the Up/Down counter designated A is incremented causing laser diode current control 320 to increase the laser beam intensity of beam 1. Conversely, if the state of the comparator indicates a capacitor voltage higher than the reference voltage after the designated accumulation cycles, the contents of the Up/Down counter designated A is decremented, reducing the laser drive current, and thus the laser beam intensity of beam 1.

To control the beam intensity of all four laser diodes, each diode is selected sequentially in turn by the state machine 302 through select signals 300, and each is regulated by incrementing or decrementing its associated Up/Down counter to control the individual currents and hence the individual intensities. Since the spatial and temporal relationship between the individual diodes are know, the synchronization of the modulation of the individual laser diodes can be calibrated to prevent scan line misalignment. It will be understood by those in the electronic art that the basic control system outlined in FIG. 7 can be extended so that the direction of each of the Up/Down counters 304 is controlled by separate reference voltage sources and separate comparators connected to the output of a common buffer amplifier 212 thereby allowing individual intensity calibration of the four laser diode sources. It will be further understood that the regulating cycle of state machine 302 can be enhanced to include a "rapid startup mode" where the contents of the Up/Down counters are initially zeroed and incremented or decremented by more than one clock pulse on each cycle when the difference between the voltage on capacitor 176 and the reference voltage exceeds a predetermined threshold.

It is to be understood that while the figures and the foregoing description illustrate the present invention, they are exemplary only. Skilled workers in the applicable arts will recognize numerous modifications and adaptations which will remain within the principles of the present invention. Therefore, the present invention is to be limited only by the following claims.

What is claimed is:

1. A raster output scanner, comprising:
    a laser source for generating a laser beam having an intensity that is dependent upon a beam control signal;
    a rotating polygon for sweeping the laser beam along a scan line plane;
    an optical fiber with a light receiving end and a light exit end, wherein said light receiving end is positioned in the scan line plane so as to intercept at least a portion of the sweeping laser beam;
    a photodetector for converting the intercepted laser beam that leaves said exit end into a beam current which depends upon said laser beam intensity;
    a scan detection circuit for producing a start-of-scan signal from said beam current; and
    a beam intensity circuit for producing said beam control signal from said beam current.

2. The raster output scanner according to claim 1, wherein said light receiving end is elongated.

3. The raster output scanner according to claim 2, wherein said optical fiber is plastic.

4. A printer comprised of:
    a photoreceptor having a photoconductive surface which moves in a process direction;
    a charging station for charging said photoconductive surface to a predetermined potential;
    a raster scanner assembly for exposing said photoconductive surface to produce a first electrostatic latent image on said photoconductive surface by sweeping a modulated laser beam across said photoreceptor in a fast scan direction which is substantially perpendicular to said process direction;
    a first developing station for depositing developing material on said first electrostatic latent image so as to produce a first toner image on said photoconductive surface;
    a transfer station for receiving said first toner image from said photoconductive surface and for transferring said first toner image onto a substrate;

wherein said raster scanner assembly includes:
- a laser source for generating a laser beam having an intensity that is dependent upon a beam control signal;
- a rotating polygon for sweeping the laser beam along a scan line plane;
- an optical fiber with a light receiving end and a light exit end, wherein said light receiving end is positioned in the scan line plane so as to intercept at least a portion of the sweeping laser beam;
- a photodetector for converting the intercepted laser beam that leaves said exit end into a beam current which depends upon said laser beam intensity;
- a scan detection circuit for producing a start-of-scan signal from said beam current; and
- a beam intensity circuit for producing said beam control signal from said beam current.

5. The printer according to claim 4, wherein said light receiving end is elongated.

6. The printer according to claim 5, wherein said optical fiber is plastic.

7. The printer according to claim 4, wherein said developing material is liquid.

8. The printer according to claim 4, wherein said scan detection circuit includes a delay circuit for producing a delayed signal from said beam current, an attenuator for producing an attenuated signal from said beam current, and a scan signal comparator for producing a start of scan signal when said delay signal exceeds said attenuated signal.

9. The printer according to claim 4, wherein said beam intensity circuit includes a beam intensity comparator for producing an error signal from a comparison of a signal derived from said beam current to a representation of a desired beam intensity.

* * * * *